June 5, 1956  A. A. LOMBARD  2,749,086
ROTOR CONSTRUCTIONS FOR TURBO MACHINES
Filed July 30, 1952  2 Sheets-Sheet 1

INVENTOR
A. A. LOMBARD
BY
Wilkinson & Mawhinney
ATTYS.

United States Patent Office 2,749,086
Patented June 5, 1956

2,749,086

ROTOR CONSTRUCTIONS FOR TURBO MACHINES

Adrian Albert Lombard, Allestree, Derby, England, assignor to Rolls-Royce Limited, Derby, England, a British company Application July 30, 1952, Serial No. 301,700

Claims priority, application Great Britain August 23, 1951

1 Claim. (Cl. 253—39)

This invention relates to turbo-machines and is concerned with rotors therefor of the type (hereinafter referred to as the type specified) comprising a disc which is liable to radial expansion under centrifugal loads experienced in use and which carries at its periphery a ring of rotor blading, and which disc has at its centre a bore having a substantial clearance from a shaft on which the disc is carried.

This invention has for an object to provide improved means for centering the disc on the shaft and for connecting the disc torsionally with the shaft.

According to the present invention, in a rotor of the type specified, the shaft is formed with a set of splines at the location of the central plane of the disc when mounted on the shaft, and the disc has formed in a piece with it at its centre a thin axially-extending sleeve-like or tubular extension of substantial axial length having at its end remote from the disc a thin re-entrant flange which has both an external clearance from the bore of the disc and its extension and an internal clearance from the shaft, and which terminates in the central plane of the disc in a thickened internally-splined bead of such dimensions as to have an interference fit with the set of splines on the shaft.

In use, the bead is subjected to only light centrifugal loads, and since the extension and re-entrant flanges are thin and accommodate any expansion of the disc due to centrifugal loads by being deformed, the bead will maintain its position in engagement with the splines on the shaft thus ensuring that the disc remains centred on and also torsionally engaged with the shaft.

Figure 1:
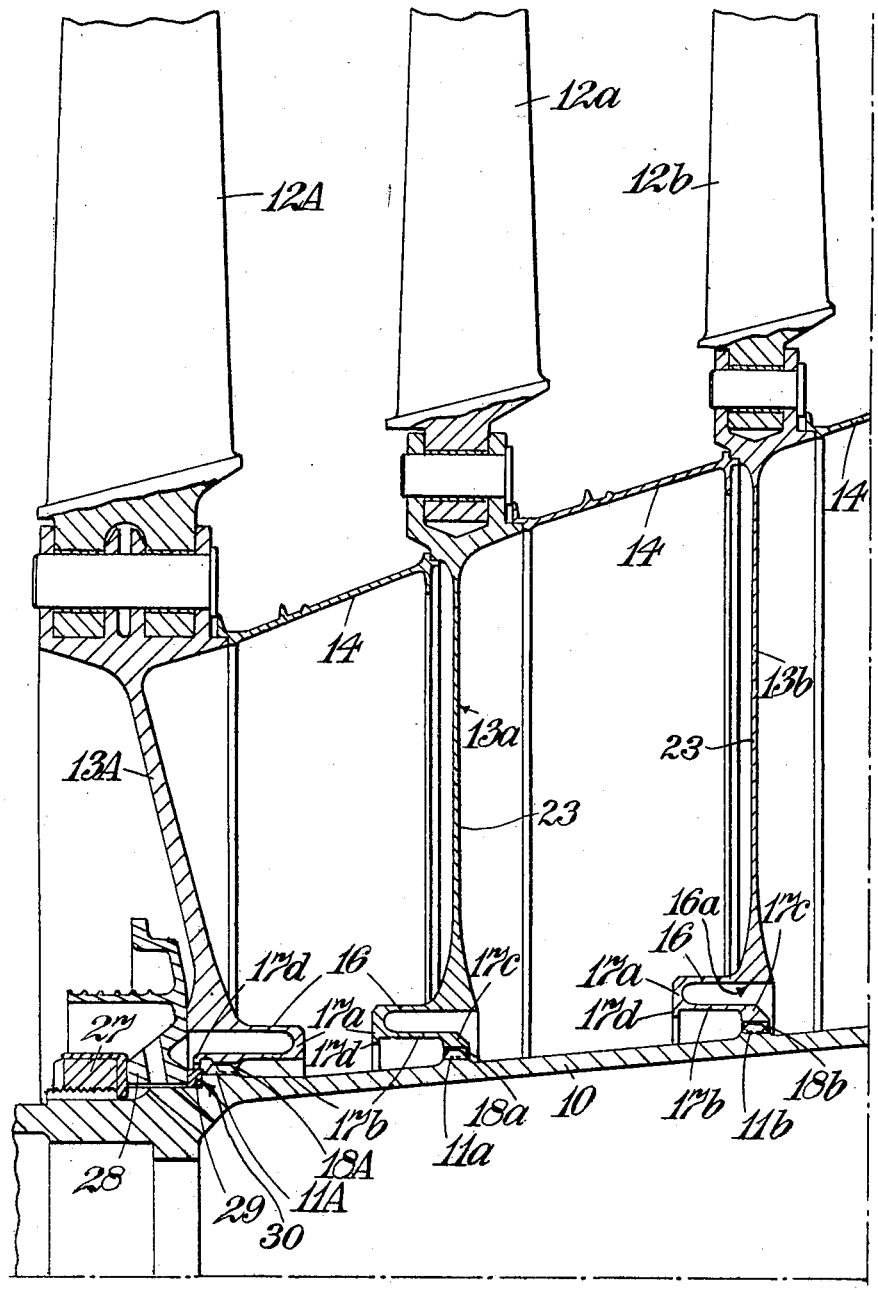
Figure 2:
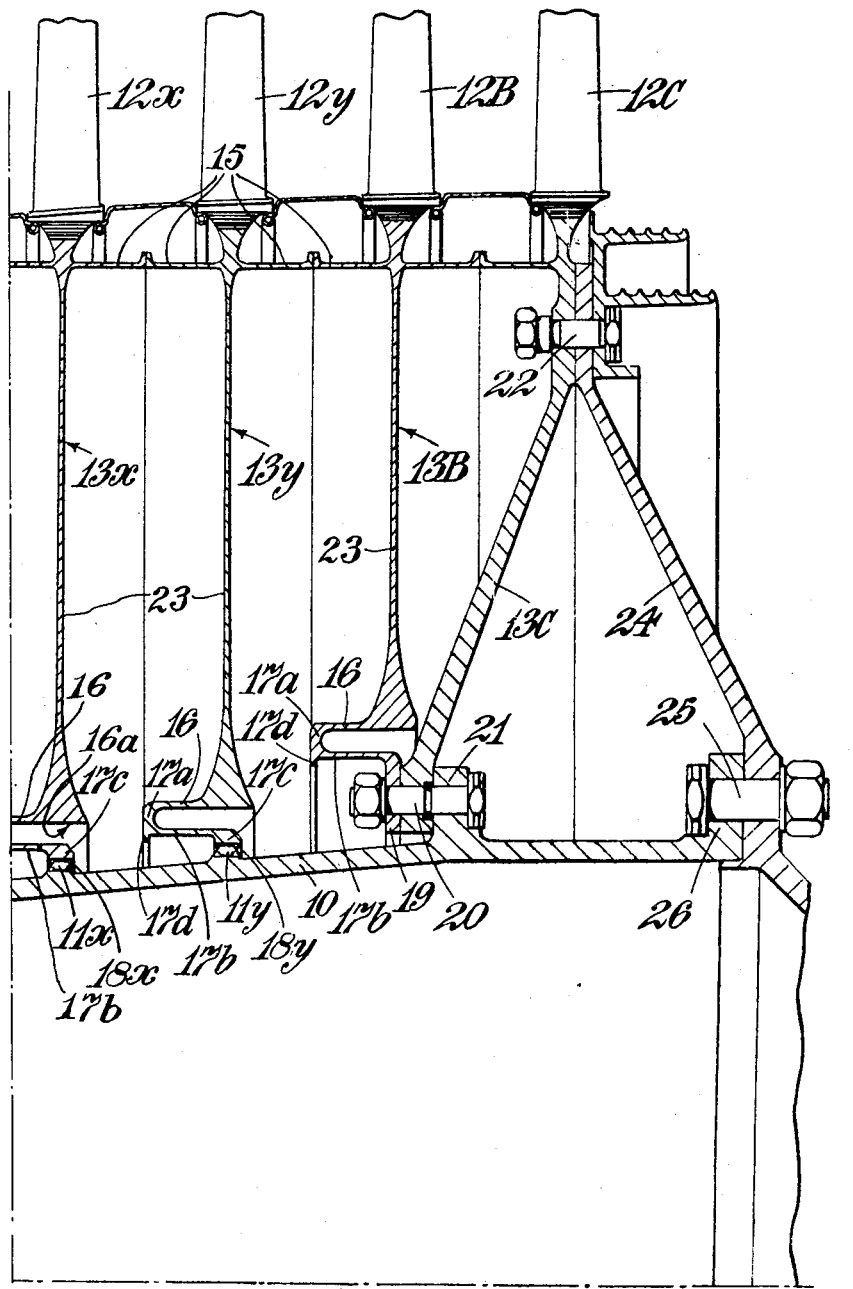

There will now be described one construction of rotor for an axial-flow compressor such as is employed in gas-turbine engines, which rotor comprises a number of blade-carrying discs mounted on a shaft in the manner of the invention. The description makes reference to the accompanying drawings in which:

Figure 1 is an axial section through part of the rotor adjacent its inlet end, and Figure 2 is an axial section through part of the rotor adjacent its delivery end.

Referring to the drawings, the rotor comprises a hollow shaft 10 of gradually increasing diameter from the low-pressure (or inlet) end to the high-pressure (or delivery) end, which shaft is formed with a plurality of sets of splines 11a, 11b . . . 11x, 11y along its length, the sets of splines being at intervals corresponding to to the spacing of a plurality of successive stages of rotor blading 12a, 12b . . . 12x, 12y, which are to form part of the rotor. The rotor blading also includes an inlet stage 12A upstream of the stage 12a, and outlet stages 12B, 12C downstream of the stage 12y.

The rotor also comprises a series of blade-carrying discs 13A, 13a, 13b, . . . 13x, 13y, 13B, 13C with central bores 16a through which the shaft 10 extends, which discs have such dimensions that in use they tend to expand under the high centrifugal loads they experience due to carrying the blades at their peripheries and the high rotational speeds at which the compressor is operated.

Each of the discs 13A, 13a . . . 13C is axially thickened at its periphery to permit the blades to be mounted on them either by pivot mountings as shown in Figure 1 or by fir-tree type mountings as shown in Figure 2 and, when they are assembled on the shaft 10, the discs are held in spaced relation at their peripheries by suitable spacer means, for instance by separate spacer rings 14 (Figure 1) or by axially-directed abutting flanges 15 (Figure 2). Each of the discs 13a . . . to 13B has a thin plane web 23 between its periphery and its inner diameter.

Each of the discs 13a, 13b . . . 13x, 13y, at its centre is spaced from the adjacent discs and the following arrangement is provided to centre these discs on the shaft 10 and to drivingly engage them with the shaft 10 through the sets of splines 11a, 11b . . . 11x, 11y on the shaft. The arrangement affords concentricity-maintaining means for the discs.

Each disc 13a, 13b, . . . 13x, 13y, is slightly thickened axially at its inner diameter and has formed in one piece with it and projecting from its inner diameter a thin sleeve-like or tubular axial extension 16 which when the disc expands under centrifugal load tends to deform radially over its length. The sleeve-like extension terminates at its end remote from the disc in a reentrant flange comprising a radially-inwardly-extending portion 17a and at the inner radius of the inwardly-projecting portion an axially-extending portion 17b. The portion 17b, extends back through and parallel to the sleeve-like extension 16 into the bore 16a of the disc to terminate adjacent the central plane of the disc. The axially-extending portion 17b of the re-entrant flange is thickened radially at its free edge to form a bead 17c and the inner surface of the bead is formed with splines 18a, 18b . . . 18x, 18y to engage the corresponding set of splines 11a, 11b, . . . 11x, 11y, on the shaft 10 and the dimensions of the bead are such that the splines inter-engage with an interference fit, that is, when the parts are free from one another and at the same temperature, the splines on the beads 17c have a smaller pitch circle diameter than the corresponding splines on the shaft 10. The axially-extending portion 17b of the re-entrant flange is also of such thickness as to be capable of deformation under centrifugal loads such as are experienced in operation of the compressor, and in use each of the discs 13a, 13b . . . 13x, 13y is held centred on and in torsional engagement with the shaft 10 due to the fact that the bead 17c is not itself subjected to high centrifugal loads and so the co-operating splines remain firmly in engagement.

The radially-inwardly-extending portion 17a of the re-entrant flange may be extended radially inwardly beyond the point of junction with it of the axially-extending portion 17b so as to form an extraction rim 17d whch can be engaged by a tool to withdraw the disc from the shaft.

In the rotor construction shown all the discs 13a, 13b . . . 13x, 13y are mounted on the shaft 10 with their sleeve-like extensions 16 extending towards the smaller end of the shaft 10.

The disc 13A carrying the first stage rotor blading 12A is of conical form having a similar centering and torsional engagement means including splines 11A on the shaft 10 and splines 18A on the disc, except that the extension 16 extends towards the larger diameter end of the shaft 10, and the extraction rim 17d is provided on an axial extension of the axial portion 17b of the re-entrant flange beyond the splines 18A thereon.

The next to last stage of rotor blading 12B is carried on a disc 13B similar to the discs 13x, 13y above described except that the internally-splined bead 17c is replaced by a radially-inwardly-extending flange 19 by means of which the disc 13B is secured by bolts 20 to a flange 21 on the shaft 10. The bolts 20 also serve to retain the disc 13C which abuts the flange 21 and which carries the last stage rotor blading 12C. This disc 13C is conical and is secured by bolts 22 adjacent its periphery to a conical member 24 which in turn is secured at its centre by bolts 25 to a flange 26 on the shaft 10. The member 24 and the flange 21 thus form abutment means for the end disc 13C.

The shaft 10 is tensioned and the disc assembly placed in compression through spacer rings 14 and flanges 15, by a ring nut 27 threaded on the shaft, which ring nut 27 bears on the disc assembly through an annular member 28 abutting the first disc 13A. A washer 29 is provided between the annular member 28 and a shoulder 30 on the shaft and the nut 27 is tightened until the washer 29 abuts the shoulder 30. By selecting the thickness of washer 29, the tension in shaft 10 and the compression at the disc peripheries can be given a desired value.

I claim:

In a rotor for a multi-stage axial-flow compressor or turbine comprising a central shaft, abutment means carried on said shaft, a plurality of annular axially-spaced discs, each disc having a periphery, and an inner diameter thereby to have a central bore, the central shaft extending through the bores in the discs and one end disc abutting said abutment means, rotor blading carried at the peripheries of the discs, spacer means between said discs adjacent their peripheries, said spacer means being in contact with adjacent discs to space the discs apart, and tensioning means co-operating with the other end disc and with the shaft to place said shaft in tension and thereby to place said discs in compression through said spacer means, concentricity-maintaining means for maintaining at least a number of said discs concentric with said shaft during operation, each of said number of discs having a thin plane web, said concentricity-maintaining means forming the only connection between said number of discs and the shaft and comprising a plurality of axially-spaced sets of splines on said shaft, the spacing of said sets of splines being such that there is a set of splines at the location of the plane of the web of each of said number of discs, and each of said number of discs having at its inner diameter and in one piece therewith a thin axially-extending tubular extension encircling the shaft in radially-spaced relation thereto, said extension having an axial length considerably greater than the axial thickness of the web and having a thin re-entrant flange including a portion extending substantially radially inwardly from the end of said extension remote from the disc and a substantially axially-extending portion which axially-extending portion extends back within said tubular extension towards the plane of the web of the disc in radially-spaced relation to both the bore of the disc and its tubular extension and which surrounds the shaft in radially-spaced relation thereto, and a thickened internally-splined bead formed at the end of said re-entrant flange in the plane of the web of the disc, the splines on said bead being of such dimensions as to have on assembly an interference fit with the corresponding set of splines on the shaft, whereby in operation the discs remain centred on and torsionally engaged with the shaft.

References Cited in the file of this patent

UNITED STATES PATENTS

| 1,326,870 | Junggren | Dec. 30, 1919 |
| 2,305,768 | Gente | Dec. 22, 1942 |
| 2,579,745 | Lombard et al. | Dec. 25, 1951 |

FOREIGN PATENTS

| 154,071 | Great Britain | Nov. 25, 1920 |